Jan. 27, 1925.
M. S. LOGAN
1,524,097
VARIABLE SPEED TRANSMISSION
Filed Jan. 28, 1922    2 Sheets-Sheet 1
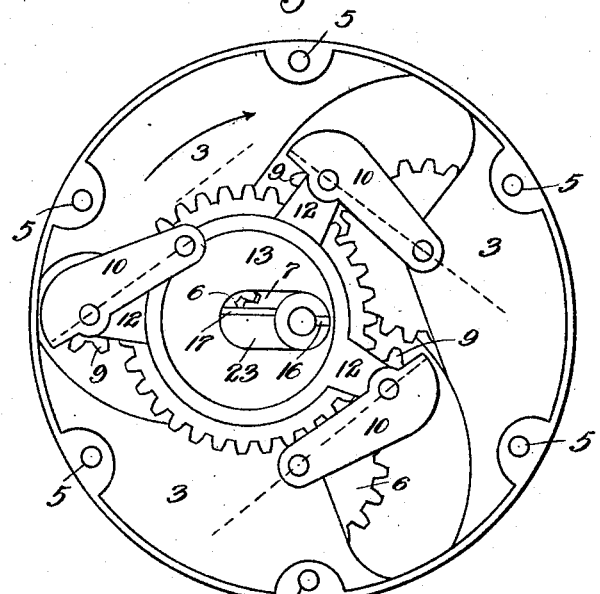
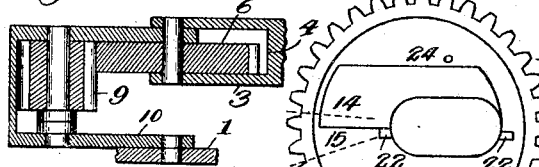
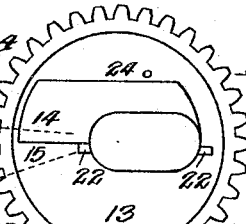
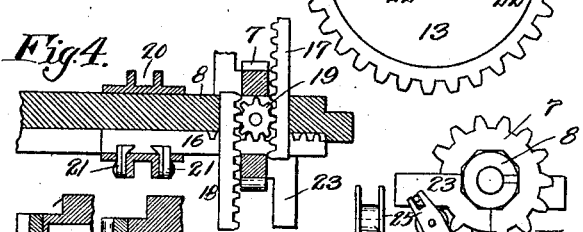
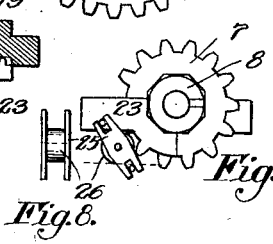
*Inventor.*
Maurice Samuel Logan Inventor.
Maurice Samuel Logan Patented Jan. 27, 1925.

1,524,097

UNITED STATES PATENT OFFICE.

MAURICE SAMUEL LOGAN, OF LOREBURN, SASKATCHEWAN, CANADA.

VARIABLE-SPEED TRANSMISSION.

Application filed January 28, 1922. Serial No. 532,396.

*To all whom it may concern:*

Be it known that I, MAURICE SAMUEL LOGAN, a citizen of Canada, residing at Loreburn, in the Province of Saskatchewan and Dominion of Canada, have invented a new and useful Variable-Speed Transmission, of which the following is a specification.

My invention relates to power transmissions for Automobiles, tractors, trucks, and any other mechanism where variable speed is desired. The objects of my invention are, first, gradual change of speed; second, change of speed without change of gear; third, change of speed by wholly mechanical means; fourth, range of speed from no speed to high speed; fifth, positive gear drive; sixth, central drive at all speeds; seventh, simplicity, strength, and durability.

I attain these objects by the mechanism illustrated in the accompanying drawing, in which:—

Figure 9:
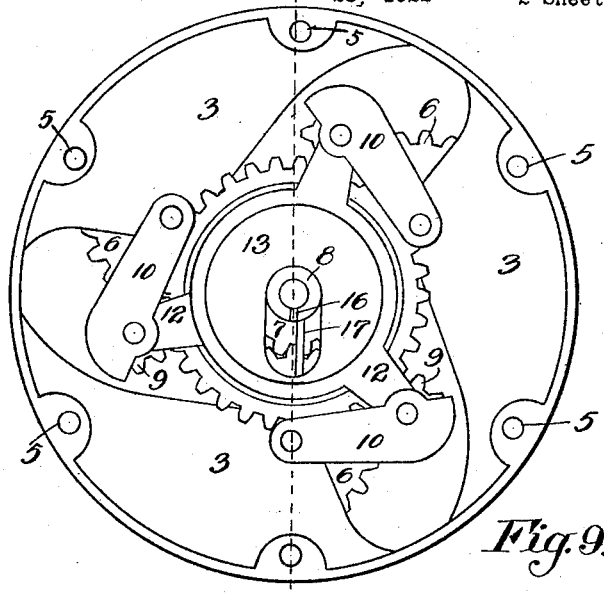
Figure 10:
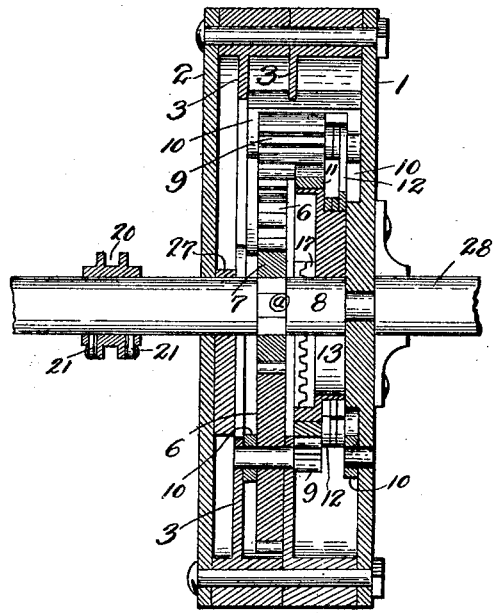

Figure 1 represents a fly-wheel with face removed, showing the variable speed transmission as encased therein. Fig. 2 is a cross section through any one of the three dotted lines in Fig. 1. Fig. 3 shows the reverse side of the eccentric. Fig. 4 is a cross section through the driven shaft and central gear, and showing the means for shifting the eccentric. Fig. 5 is an end view of the driven shaft and central gear with arm and nonfriction roller. Figs. 6 and 7 are cross sections through the dotted lines 14 and 15, in Fig. 3, respectively. Fig. 8 is a face view of the nonfriction roller and retainer, a side view of which is shown in Fig. 5. Fig. 9 is same as Fig. 1 except the eccentric is in central position. Fig. 10 is a cross section through the dotted line in Fig. 9, and with face plate 1 in place.

Similar numerals refer to similar parts throughout the several views.

In Fig. 2, 1 is a section of the face plate which is removed in Fig. 1. 2 is a section of the other face plate. The extension of gear 9 meshes with the eccentric ring, and the clearance in the main axle is for the eccentric. Face plate 1 is attached rigidly to the end of the crank shaft 28 (see Fig. 10) and carries a bearing in which the end of the driven shaft 8 rests. The wings 3, 3, 3 (Figs. 1 and 2) are cast integral with the rim of the fly-wheel, in two sections as indicated by the division line 4 (Fig. 2). These two rim castings and the two face plates are clamped together by bolts passing through holes 5 (Fig. 1).

The fly-wheel rotates in the direction indicated by the arrow and carries gears 6, 6, 6 and 9, 9, 9 (Figs. 1 and 2) around with it. Said gears 6, 6, 6 mesh with the central gear 7 (Figs. 1, 4 and 5) which is mounted rigidly on the driven shaft 8. Gears 9, 9, 9 (Figs. 1 and 2) are mounted on the swinging frames 10, 10, 10 which hold them in mesh with gears 6, 6, 6, while allowing them to be held in mesh with eccentric ring 11 by arms 12, 12, 12 which are attached to separate eccentric rings.

Said gears 6 and 9 rotate reversely, thus causing gear 7 and eccentric 13 to pull against each other in their combined hold against the pull of the fly-wheel, on the principle of a differential or evener.

When eccentric 13 is on centre, the eccentric ring 11 turns freely and gives no holding power to the eccentric. Hence gears 6 merely travel around gear 7 without turning it. This is the no speed adjustment. When said eccentric is off centre, it exerts an off-centre pull against the rotation of the fly-wheel. This off-centre pull is from both sides balancing across the centre of the eccentric; for since the eccentric ring 11 is free to turn, any pressure on one side will balance itself across the centre to the opposite side. The centre of the eccentric thus receives the resultant pressure from both sides. When the centre of the eccentric is in line with the pitch circle of the central gear 7, the two elements have equal holding leverage, and hence balance each other in their combined hold against the rotation of the fly-wheel, so that the fly-wheel cannot turn without carrying the whole mechanism around with it. This is the high speed adjustment. Between these extreme adjustments, every intermediate speed may be obtained.

When the whole mechanism rotates with the fly-wheel as a unit there is no gear travel, and hence no wear. The greatest gear travel is when running idle, involving only the wear of idle running. The wear is thus reduced to a minimum at all speeds. The fly-wheel is oil-tight, and oil contained in it is carried around so as to give the most perfect lubrication.

Pulling leverage varies with the speed of the fly-wheel relative to the rotation of the driven shaft. The whole pull of the motor goes into the load so long as the adjustment corresponds to the load. A motor begins to race the instant any pull fails to go into the load. Hence so long as the motor is pulling (not racing) there is no loss of power.

Gear 19 (Fig. 4) sets in a slot, about one half inch wide, through the shaft 8 and turns loosely on a pin passing through said shaft crosswise to the slot. Rack 16 (Figs. 1 and 4) slides in a groove in the side of said shaft, and is keyed rigidly to the shifting collar 20 by the keys 21, 21. Said shifting collar slides along the shaft and is shifted by a lever (not shown) in the usual manner. Rack 16 turns the gear 19 which in turn shifts the racks 17 and 18 in opposite directions. The ends of rack 17 fit into the recesses 22, 22 (Fig. 3) in the side of the eccentric, so that shifting said rack shifts the eccentric also. Rack 18 shifts a counter weight (not shown) in a similar manner but in the opposite direction. The sole purpose of the counter weight is to preserve the fly-wheel balance. Instead of the shifting counterweight, a mean counterweight may be attached rigidly to the driven shaft, as shown at 27 in Fig. 10, or the entire gear system may be duplicated and the two systems operated to counter-balance each other.

The arm 23 (Figs. 1, 4 and 5) prevents the eccentric from rotating on shaft 8. The dotted line in Fig. 5 represents the edge of the track 24 (Fig. 3) when in working position. The retainer 25 (Figs. 5 and 8) holds the nonfriction roller in position without interferring with its rolling. Observe that the pressure side of the eccentric presses against said nonfriction roller and that the pressure is sidewise to the line of shift. This makes the eccentric shift easily.

In the foregoing specification, the gear casing carrying gears 6 and 9 is regarded as the drive element, and the shaft 8 carrying gear 7 and eccentric 13 as the driven element. This order may be reversed, in which case, the gear casing cannot be utilized as the fly-wheel, and a separate fly-wheel attached to the drive element will be required.

Any reverse mechanism in common use may be used with this transmission, giving all speeds forward or reverse.

I claim:

1. In a variable speed transmission, the combination of a drive element consisting of a rotatable gear support carrying differential gearing, and a driven element, concentric with said drive element, consisting of a shaft carrying a central gear mounted rigidly thereon and an eccentric mounted adjustably thereon, said central gear and said eccentric being connected differentially to said drive element through said differential gearing, and means for shifting said eccentric, substantially as shown and described.

2. In a variable speed transmission, the combination of a drive element and a driven element concentric with each other, one consisting of a rotatable gear support carrying differential gearing, and the other consisting of a shaft carrying a central gear mounted rigidly thereon and an eccentric mounted adjustably thereon, said central gear and said eccentric being connected through said differential gearing, and means for shifting said eccentric, substantially as shown and described.

3. In a variable speed transmission, the combination of a central gear mounted rigidly on a central shaft, an eccentric, carrying a cog-bearing eccentric ring, and mounted adjustably on said shaft, differential gearing, carried on a rotatable gear support and operatively meshing with said central gear and said eccentric ring, and means for shifting said eccentric, substantially as shown and described.

4. In a variable speed transmission, the combination of a central gear mounted rigidly on a central shaft, an eccentric, carrying a cog-bearing eccentric ring, and mounted adjustably on said shaft, a gear casing mounted rotatably on said shaft and carrying a series of differential gearing operatively meshing with said central gear and with said eccentric ring, means for preventing said eccentric from rotating on said shaft, and means for shifting said eccentric, substantially as shown and described.

5. In a variable speed transmission, the combination of a rotatable gear support carrying planetary gears which mesh with a central gear mounted rigidly on a central shaft, and swinging gears mounted on swinging frames which are mounted centrally with said planetary gears and which hold said swinging gears in mesh with said planetary gears, an eccentric carrying a cog-bearing eccentric ring and mounted adjustably on said shaft, separate eccentric rings mounted on said eccentric carrying arms which hold said swinging gears in mesh with said cog-gearing eccentric ring, and means for shifting said eccentric, substantially as shown and described.

6. In a variable speed transmission, the combination of a drive element and a driven element concentric with each other, one element carrying a fixed central gear 7 and adjustable eccentric 13, said eccentric 13 being provided with a cog-bearing eccentric ring 11 and arm-bearing eccentric rings 12; the other element carrying planetary gears 6 and differential pinions 9 mounted on swinging frames 10, said planetary gears 6 meshing with said central gear 7 and said differential pinions 9 held in mesh with said planetary gear 6 by said swinging frames 10 and held in mesh with said cog-bearing eccentric ring 11 by said arm-bearing eccentric rings 12, and means for shifting said eccentric 13.

7. In a variable speed transmission, the combination of a drive element and a driven element concentric with each other, one element carrying a fixed central gear 7 and an adjustable eccentric gear 11, the other element carrying means for applying the power differentially between said central gear 7 and said eccentric gear 11, said means consisting of planetary gears 6 meshing with said central gear 7 and power conveying swinging frames 10 mounted centrally with said planetary gears 6 and bearing on their swinging ends differential pinions 9 meshing with said planetary gears 6 and also held in mesh with said eccentric gear 11 by centre-connecting links 12; and means for adjusting the eccentricity of said eccentric gear 11.

8. In a variable speed transmission, a counterbalancing combination of unit systems, each unit system consisting of a drive element and a driven element concentric with each other, one element carrying a fixed central gear 7 and an adjustable eccentric gear 11 operatively connected by differential gearing carried by the other element, said differential gearing consisting of planetary gears 6 meshing with said central gear 7 and swinging frames 10 mounted centrally with said planetary gears 6 and bearing on their swinging ends pinions 9 meshing with said planetary gears 6 and also held in mesh with said eccentric gear 11 by centre-connecting links 12; and means for adjusting the eccentricity of said eccentric gear 11.

MAURICE SAMUEL LOGAN.

Witnesses:
 R. G. BALDWIN.
 J. P. BALDWIN.